United States Patent [19]

Yamaya

[11] Patent Number: 5,240,992
[45] Date of Patent: Aug. 31, 1993

[54] AQUEOUS EMULSION COMPOSITION OF A SILYL GROUP-CONTAINING COPOLYMER

[75] Inventor: Masaaki Yamaya, Gunma, Japan

[73] Assignee: Shin-Etsu Chemical Co., Ltd., Tokyo, Japan

[21] Appl. No.: 973,882

[22] Filed: Nov. 10, 1992

[30] Foreign Application Priority Data

Nov. 11, 1991 [JP] Japan .................. 3-322480

[51] Int. Cl.$^5$ .............................. C08L 43/04
[52] U.S. Cl. ........................ 524/806; 524/547
[58] Field of Search ................... 524/547, 806

[56] References Cited

U.S. PATENT DOCUMENTS 3,449,293  6/1969  Burzynski et al. ............. 526/279 X

FOREIGN PATENT DOCUMENTS 0350240  1/1990  European Pat. Off. .
0377188  7/1990  European Pat. Off. .
0952855  8/1982  U.S.S.R. .......................... 524/806

Primary Examiner—Joseph L. Schofer
Assistant Examiner—J. M. Reddick
Attorney, Agent, or Firm—Millen, White, Zelano & Branigan

[57] ABSTRACT

Disclosed is an aqueous emulsion composition of a copolymeric resin having excellent storage stability and capable of forming a coating film of the resin on a substrate surface with excellent adhesion by virtue of introduction of a moiety of the monomeric units having an alkoxy-containing organosilyl group to serve as a silane coupling agent. The organosilyl group-containing moiety is introduced into the resin by the copolymerization of an organosilane compound represented by the general formula $Vi-R^1-SiMe_{3-n}(OR^2)_n$, in which Vi is a vinyl group, Me is a methyl group, $R^1$ is a divalent hydrocarbon group having 4 to 12 carbon atoms, $R^2$ is a monovalent hydrocarbon group having 1 to 6 carbon atoms and n is 1, 2 or 3. As a consequence of isolation of the vinyl group from the silicon atom with intervention of the group $R^1$, the organosilane compound has good copolymerizability with other ethylenically unsaturated organic monomers.

6 Claims, No Drawings

AQUEOUS EMULSION COMPOSITION OF A SILYL GROUP-CONTAINING COPOLYMER

BACKGROUND OF THE INVENTION

The present invention relates to an aqueous emulsion composition of a silyl group-containing copolymer. More particularly, the invention relates to an aqueous emulsion composition of a copolymer having a silyl group with good storage stability despite the high content of alkoxy or phenoxy groups bonded to the silicon atoms. The aqueous emulsion composition of the copolymer of the invention is useful as a vehicle or base ingredient of water-based coating compositions or adhesives.

It is a conventional technology that a coating composition or adhesive is imparted with improved adhesion to the substrate surface by introducing a silane coupling agent thereinto. A silane coupling agent can be introduced into such a composition either one of the following three methods including direct addition of the silane coupling agent to the composition, grafting of the silane coupling agent on to the base polymer in the composition and copolymerization of the silane coupling agent with another copolymerizable monomer. When the composition is a non-aqueous system having solubility in an organic solvent, any of the above mentioned three methods can be undertaken and the composition having a silane coupling agent introduced thereinto has no problems in respect of the adhesiveness and stability in the lapse of time.

In view of the problems of toxicity against human body and environmental pollution as well as the danger of fire caused by the organic solvent, organic solvent-based coating and adhesive compositions are in recent years under a trend of continuous shift toward water-based compositions. When a silane coupling agent is desired to be introduced into such a water-based composition, difficult problems are caused in respect of a decrease in the adhesiveness and loss of stability in the lapse of time because the hydrolyzable groups such as alkoxy groups in the silane coupling agent are readily hydrolyzed by water and the dehydration condensation takes place between the thus formed silanol groups eventually to cause gelation of the composition.

With an object to solve the above mentioned problems along with a possibility of improving adhesion as well as weatherability of a water-based coating or adhesive composition, a proposal has been made in Japanese Patent Kokai 2-308887 and elsewhere for an aqueous emulsion composition of a copolymer of a silane coupling agent and another copolymerizable monomer. As the silane coupling agent from which the above mentioned aqueous emulsion composition is prepared, two classes of organosilane compounds including vinyl-functional alkoxy silanes and methacryloxy-functional alkoxy silanes have been studies but these silane compounds have several defects. For example, vinyl-functional silane compounds have relatively low copolymerizability with other vinyl comonomers because the vinyl group therein is directly bonded to the silicon atom and under strong influence of the silicon atom so that a copolymer having a sufficiently high molecular weight can hardly be obtained resulting in a decrease in the adhesion when the vinyl-functional silane is used in a large amount while, when the amount thereof is small, the desired effect as a silane coupling agent can little be exhibited. When a copolymer is prepared from a methacryloxy-functional alkoxy silane, the resistance of the alkoxy groups against hydrolysis is low so that the aqueous emulsion composition has a problem in the storage stability.

SUMMARY OF THE INVENTION

The present invention accordingly has an object to provide a novel aqueous emulsion composition of a copolymer between a silyl group-containing monomer and another ethylenically unsaturated monomer copolymerizable therewith having excellent adhesion and storage stability in view of the above described problems and disadvantages in the prior art emulsion compositions.

Thus, the aqueous emulsion composition of a silyl group-containing copolymer provided by the invention is an aqueous emulsion of a copolymer formed by the emulsion copolymerization of a monomer mixture consisting of (a) from 0.01 to 30% by weight of an organosilane compound having a vinyl group as represented by the general formula $$\text{Vi}-\text{R}^1-\text{SiMe}_{3-n}(\text{OR}^2)_n, \quad (\text{I})$$

in which Vi is a vinyl group, Me is a methyl group, $R^1$ is a divalent hydrocarbon group having 4 to 12 carbon atoms, $R^2$ is a monovalent hydrocarbon group having 1 to 6 carbon atoms and the subscript n is 1, 2 or 3, and (b) from 99.99 to 70% by weight of an ethylenically unsaturated organic compound containing no silicon atom, in an aqueous medium in the presence of a free-radical polymerization initiator.

In particular, the divalent hydrocarbon group denoted by $R^1$ is a straightly linear alkylene group or a hydrocarbon group containing a benzene ring.

DETAILED DESCRIPTION OF THE PREFERRED EMBODIMENTS

The most characteristic feature of the inventive aqueous emulsion composition is that the organosilane compound copolymerized with another copolymerizable monomer has a vinyl group which, however, is not directly bonded to the silicon atom but isolated from the silicon atoms with intervention of a divalent hydrocarbon group $R^1$ having 4 to 12 carbon atoms. As a consequence of isolation of the vinyl group from the silicon atom, the copolymerizability of the vinyl group is little affected by the silicon atom.

In the general formula (I) representing the organosilane compound as the comonomer (a) in the copolymerization, the symbol $R^1$ denotes a divalent hydrocarbon group having 4 to 12 carbon atoms exemplified by the groups expressed by the following formulas: $-(CH_2)_4-$; $-(CH_2)_2-CHMe-$; $-(CH_2)_6-$; $-(CH_2)_4-CHMe-$; $-(CH_2)_8-$; $-(CH_2)_6-CHMe-$; $-(CH_2)_{10}-$; $-(CH_2)_8-CHMe-$; $-(CH_2)_{12}-$; $-(CH_2)_{10}-CHMe-$; $-C_6H_4-$ (phenylene group); $-C_6H_{10}-$ (cyclohexylene group) and the like, in which Me is a methyl group, of which particularly important are $-(CH_2)_4-$, $-(CH_2)_6-$ and $-(CH_2)_8-$.

The group denoted by $R^2$ in the general formula (I) is a monovalent hydrocarbon group having 1 to 6 carbon atoms exemplified by the groups expressed by the following formulas: $Me-$; $MeCH_2-$; $Me-(CH_2)_2-$; $Me-CHMe-$; $Me-(CH_2)_3-$; $Me-CHMe-CH_2-$; $Me-CH_2-CHMe-$; $Me-(CH_2)_5-$; $CH_2=CH-$;

$C_6H_5$— (phenyl group); $C_6H_{11}$-(cyclohexyl group) and the like, in which Me is a methyl group, of which particularly important are methyl and ethyl groups.

The subscript n in the general formula (I) is a positive integer of 1, 2 or 3 so that the organosilane compound has at least one alkoxy or phenoxy group. Preferably, the subscript n is 2 or 3 in respect of the mechanical strengths og the polymer film formed from the emulsion composition as well as the adhesion thereof to the substrate surface. It is not always necessary when n is 2 or 3 that the groups $R^2$ are all the same ones.

Examples of the organosilane compound as the comonomer (a) accordingly include those expressed by the following structural formulas, in which Me is a methyl group, Et is an ethyl group, Vi is a vinyl group, Pn is a phenylene group and Ph is a phenyl group:
$(MeO)_3Si—(CH_2)_4—Vi$; $(MeO)_2MeSi—(CH_2)_4—Vi$; $(EtO)_3Si—(CH_2)_4—Vi$; $(EtO)_2MeSi—(CH_2)_4—Vi$; $(MeO)_3Si—(CH_2)_8—Vi$; $(MeO)_2MeSi—(CH_2)_8—Vi$; $(EtO)_3Si—(CH_2)_8—Vi$; $(EtO)_2MeSi—(CH_2)_8—Vi$; $(MeO)_3Si—(CH_2)_{12}—Vi$; $(MeO)_2MeSi—(CH_2)_{12}—Vi$; $(PhO)_3Si—(CH_2)_4—Vi$; $(PhO)_2MeSi—(CH_2)_4—Vi$; $(CH_2=CMe—O)_3Si—(CH_2)_4—Vi$; $(CH_2=CMe—O)_2MeSi—(CH_2)_4—Vi$; $(MeO)_3Si—Pn—Vi$; $(EtO)_3Si—Pn—Vi$; $(MeO)_2MeSi—Pn—Vi$; $(MeO)_3Si—CH_2—Pn—Vi$; $(MeO)_2MeSi—CH_2—Pn—Vi$; $(MeO)_3Si—(CH_2)_3—Pn—CH_2—Vi$ and the like.

The group denoted by $R^1$ in the general formula (I) is a divalent hydrocarbon group having 4 to 12 carbon atoms as a linking unit between the vinyl group and the silicon atom. It has been unexpectedly discovered that, when and only when the group denoted by $R^1$ has 4 to 12 carbon atoms, the aqueous emulsion composition can be imparted with high storage stability although the mechanism therefor is unclear. It is presumable that the hydrophobic nature of this group has some contribution to the storage stability of the aqueous emulsion composition. When the number of carbon atoms in the group $R^1$ is smaller than 4, the aqueous emulsion composition cannot be imparted with high stability in storage. When the number of carbon atoms in $R^1$ is 13 or larger, the organosilane compound of the general formula (I) would have an unduly high boiling point so that a difficulty is encountered in the purification thereof by distillation. Different from a vinyl silane compound having a vinyl group directly bonded to the silicon atom, the comonomer (a) as defined here has no problem in the copolymerizability with another ethylenically unsaturated monomer as the comonomer (b).

When the organosilane compound as the comonomer (a) has 2 or 3 groups $R^2$, they can be the same ones or can be different each from the others. Further, it is optional to use two kinds or more of the organosilane compounds in combination as the comonomer (a).

The comonomer (b) to be copolymerized with the above described organosilane compound as the comonomer (a) is an ethylenically unsaturated organic compound. Examples of such an ethylenically unsaturated organic compound copolymerizable with the organosilane compound include: $\alpha,\beta$-unsaturated carboxylic acids such as (meth)acrylic acid, itaconic acid and the like; esters of (meth)acrylic acid such as methyl (meth)acrylate, ethyl (meth)acrylate, propyl (meth)acrylate, butyl (meth)acrylate, isobutyl (meth)acrylate, pentyl (meth)acrylate, hexyl (meth)acrylate, octyl (meth)acrylate, 2-ethylhexyl (meth)acrylate, lauryl (meth)acrylate, cyclohexyl (meth)acrylate, stearyl (meth)acrylate, allyl (meth)acrylate, glycicyl (meth)acrylate, 2-methoxyethyl (meth)acrylate, 2-(N,N-dimethylamino)ethyl (meth)acrylate and the like; (meth)acrylamide compounds such as N-butoxymethyl (meth)acrylamide, N-methylol (meth)acrylamide and the like; maleic anhydride; styrene compounds such as styrene, $\alpha$-methyl styrene, vinyl toluene and the like; (meth)acrylonitrile compounds; $\alpha$-olefins such as 1-hexene, 1-decene, 1-octadecene and the like; vinyl chloride; vinylidene chloride; vinyl esters such as vinyl acetate, vinyl propionate and the like; diallyl ether; vinyl ethers such as perfluorobutyl vinyl ether and the like; allyl glycidyl ether; N-vinyl pyrrolidone; divinyl benzene; ehtyleneglycol di(meth)acrylate; and so on. Particularly preferable among the above named comonomers are (meth)acrylic acid, methyl (meth)acrylate, ethyl (meth)acrylate, butyl (meth)acrylate, 2-ethylhexyl (meth)acrylate, glycidyl (meth)acrylate, N-methylol (meth)acrylamide, maleic anhydride, styrene, acrylonitrile, vinyl acetate and allyl glycidyl ether, of which esters of acrylic and methacrylic acids are most preferable. These monomeric compounds belonging to the class of the comonomer (b) can be used either singly or as a combination of two kinds or more according to need.

The amount of the organosilane compound as the comonomer (a) in the monomer mixture to be subjected to the emulsion copolymerization is in the range from 0.01 to 30% by weight or, preferably, from 0.05 to 20% by weight. When the amount of the comonomer (a) is too small, the adhesion of the emulsion composition cannot be fully improved as desired. When the amount of the comonomer (a) is too large, on the other hand, the stability of the aqueous emulsion composition would be decreased.

The inventive aqueous emulsion composition can be prepared by the emulsion copolymerization of a monomer mixture consisting of the above described comonomers (a) and (b) according to a known procedure of emulsion polymerization by using a conventional free-radical polymerization initiator. Examples of suitable free-radical polymerization initiators include water-soluble free-radical generating agents exemplified by hydrogen peroxide, persulfates, e.g., potassium persulfate and ammonium persulfate, tert-butyl hydroperoxide, azobisaminopropane hydrochloride and the like and monomer-soluble free-radical generating agents exemplified by benzoyl peroxide, cumene hydroperoxide, tert-butyl hydroperoxide, dibutyl peroxide, cumylperoxy neodecanoate, cumylperoxy octoate, $\alpha,\alpha'$-azobisisobutyronitrile and the like.

It is optional that the above named polymerization initiator is used in combination with a known reducing agent such as sodium hydrogensulfite, Rongalit, L-ascorbic acid, saccharides, amine compounds and the like to form a redox polymerization system. It is also optional to use a known chain transfer agent such as various kinds of alcohols, catechols, thiols and the like with an object to control the degree of polymerization of the copolymer obtained by the copolymerization.

The emulsifying agent used for emulsifying the monomer mixture in an aqueous medium is not particularly limitative and can be any of conventional surface active agents including anionic surface active agents such as salts of an alkyl or alkylaryl sulfate or sulfonate, salts of an alkylaryl succinate and the like, non-ionic surface active agents such as polyoxyethylene alkyl ethers, polyoxyethylene alkylphenyl ethers, esters of a polyoxyethylene carboxylic acid and the like, cationic surface active agents such as long-chain alkyl trimethyl ammonium salts, benzyl trialkyl ammonium chlorides and the like. It is optional to use a water-soluble polymeric substance such as water-soluble oligomers, e.g., polyacrylamide, polyvinyl alcohols, hydroxyethyl cellulose and the like in combination with the above mentioned emulsifying agent as an emulsion stabilizer.

The emulsion polymerization is performed at a temperature of, preferably, 30° to 90° C. in an atmosphere of an inert gas such as nitrogen. It is of course optional that the polymerization mixture is admixed, before, during or after the polymerization, with various kinds of known additives such as film-forming aids, defoaming agents, thickening agents, moisturizing agents, pigments, watersoluble resins and the like each in a limited amount according to need.

In the following, the aqueous emulsion composition of the invention is illustrated in more detail by way of examples and comparative examples.

EXAMPLE 1

Into a three-necked flask of 2-liters capacity equipped with a stirrer, reflux condenser, thermometer and gas inlet tube were introduced 400 g of deionized water, 5 g of sodium lauryl sulfate and 25 g of polyoxyethylene nonylphenyl ether to form an aqueous medium which was heated up to a temperature of 75° to 80° C. under a stream of nitrogen gas. After addition of 1 g of potassium persulfate thereto, a monomer mixture consisting of 25 g of decen-9-yl trimethoxy silane, 150 g of butyl acrylate, 125 g of 2-ethylhexyl acrylate and 200 g of styrene and an aqueous solution of 1 g of ammonium persulfate dissolved in 100 g of deionized water were separately added each dropwise into the aqueous medium in the flask at the above mentioned temperature under agitation taking three hours. After completion of the dropwise addition thereof, the polymerization mixture was agitated for additional 1 hour under the same temperature to complete the polymerization reaction.

The thus obtained polymerization mixture after completion of the polymerization was adjusted to have a pH of 8.0 and a solid content of 40% by weight by adding ammonia water and deionized water. This aqueous emulsion composition is referred to as the emulsion A hereinafter.

EXAMPLE 2

Into the same reaction vessel as used in Example 1 were introduced 500 g of deionized water, 5 g of sodium lauryl sulfate and 25 g of polyoxyethylene nonylphenyl ether to form an aqueous medium. The aqueous medium was kept at a temperature of 30° C. and 1.0 g of tert-butyl hydroperoxide, 0.5 g of L-ascorbic acid and 0.002 g of iron (II) sulfate heptahydrate were added thereto. A mixture consisting of 250 g of 2-ethylhexyl acrylate, 200 g of methyl methacrylate, 5 g of 4-vinylphenyl trimethoxy silane and 45 g of methacrylic acid was added dropwise into the aqueous medium kept at 30° C. with agitation taking three hours. After completion of the dropwise addition of the monomer mixture, the reaction mixture in the flask was further agitated for additional one hour to complete the polymerization reaction.

The thus obtained polymerization mixture after completion of the polymerization was adjusted to have a pH of 8.0 and a solid content of 40% by weight by the addition of ammonia water and deionized water. This aqueous emulsion composition is referred to as the emulsion B hereinafter.

EXAMPLE 3

The procedure for the preparation of an aqueous emulsion composition having a pH of 8.0 and a solid content of 40% by weight, referred to as the emulsion C hereinafter, was substantially the same as in Example 1 except that the monomer mixture consisted of 2.5 g of hexen-5-yl methyl diethoxy silane, 250 g of methyl methacrylate, 225 g of 2-ethylhexyl acrylate and 22.5 g of methacrylic acid.

COMPARATIVE EXAMPLE 1

The procedure for the preparation of an aqueous emulsion composition having a pH of 8.0 and a solid content of 40% by weight, referred to as the emulsion D hereinafter, was substantially the same as in Example 1 except that the decen-9-yl trimethoxy silane in Example 1 was replaced with the same amount of 3-methacryloxypropyl trimethoxy silane.

COMPARATIVE EXAMPLE 2

The procedure for the preparation of an aqueous emulsion composition having a pH of 8.0 and a solid content of 40% by weight, referred to as the emulsion E hereinafter, was substantially the same as in Example 1 except that the decen-9-yl trimethoxy silane in Example 1 was replaced with the same amount of vinyl trimethoxy silane.

EVALUATION OF THE AQUEOUS EMULSION COMPOSITIONS A TO E

A 100 g portion of each of the emulsions A to E was taken in a colorless and transparent glass bottle of 100 ml capacity which was tightly stoppered and stored at 50° C. for 1 month. The emulsion after this storage period was visually inspected to evaluate the stability thereof by the changes in the appearance. The results were that absolutely no change was detected in the apperance of the emulsion A, B and C while an increase was noted in the viscosity of the emulsion E and a viscosity increase as well as formation of a gelled matter were noted in the emulsion D.

Further, each of the emulsions was diluted to have a solid content of 10% by weight. A glass plate was immersed in the diluted emulsion to be coated therewith followed by drying at 20° C. for 1 week to form a dried coating film of the copolymer. This coating film was subjected to the test of adhesion by the checkerboard peeling test with a pressure-sensitive adhesive tape according to the procedure specified in JIS K 5400. The results of the test were that absolutely no peeling was noted of the 100 checkerboard squares of the coating films prepared from the emulsions A, B and C while all of the 100 chekcerboard squares and 90 of the 100 checkerboard squares were removed from the coating films prepared from the emulsions D and E, respectively.

What is claimed is:

1. An aqueous emulsion composition of a silyl group-containing copolymer which is an aqueous emulsion of a copolymer formed by the emulsion copolymerization of a monomer mixture consisting of (a) from 0.01 to 30% by weight of an organosilane compound having a vinyl group as represented by the general formula $$Vi-R^1-SiMe_{3-n}(OR^2)_n,$$

in which Vi is a vinyl group, Me is a methyl group, $R^1$ is a divalent hydrocarbon group having 4 to 12 carbon atoms, $R^2$ is a monovalent hydrocarbon group having 1 to 6 carbon atoms and the subscript n is 1, 2 or 3, and (b) from 99.99 to 70% by weight of an ethylenically unsaturated organic compound containing no silicon atom, in an aqueous medium in the presence of a free-radical polymerization initiator.

2. The aqueous emulsion composition of a silyl group-containing copolymer as claimed in claim 1 in which the divalent hydrocarbon group denoted by $R^1$ is selected from the groups expressed by the formulas: $—(CH_2)_4—$; $—(CH_2)_6—$ and $—(CH_2)_8—$.

3. The aqueous emulsion composition of a silyl group-containing copolymer as claimed in claim 1 in which the monovalent hydrocarbon group denoted by $R^1$ is selected from the groups expressed by the formulas: Me—; MeCH$_2$—; Me—(CH$_2$)$_2$—; Me—CHMe—; Me—(CH$_2$)$_3$—; Me—CHMe—CH$_2$—; Me—CH$_2$—CHMe—; Me—(CH$_2$)$_5$—; CH$_2$=CH—; C$_6$H$_5$—(-phenyl group) and C$_6$H$_{11}$—(cyclo-hexyl group), in which Me is a methyl group.

4. The aqueous emulsion composition of a silyl group-containing copolymer as claimed in claim 1 in which the subscript n is 2 or 3.

5. The aqueous emulsion composition of a silyl group-containing copolymer as claimed in claim 1 in which the ethylenically unsaturated organic compound containing no silicon atom is selected from the group consisting of (meth)acrylic acid, methyl (meth)acrylate, ethyl (meth)acrylate, butyl (meth)acrylate, 2-ethylhexyl (meth)acrylate, glycidyl (meth)acrylate, N-methylol (meth)acrylamide, maleic anhydride, styrene, acrylonitrile, vinyl acetate and allyl glycidyl ether.

6. The aqueous emulsion composition of a silyl group-containing copolymer as claimed in claim 1 in which the monomer mixture consists of from 0.05 to 20% by weight of the component (a) and from 99.95 to 80% by weight of the component (b).

* * * * *

UNITED STATES PATENT AND TRADEMARK OFFICE
CERTIFICATE OF CORRECTION

PATENT NO. : 5,240,992

DATED : 8/31/93

INVENTOR(S) : Masaaki YAMAYA

It is certified that error appears in the above-identified patent and that said Letters Patent is hereby corrected as shown below:

Claim 3; Col. 7; Line 17:

Change " $R^1$ " to read $--R^2--$.

Signed and Sealed this

Twenty-second Day of March, 1994

Attest:

BRUCE LEHMAN

Attesting Officer

Commissioner of Patents and Trademarks